UNITED STATES PATENT OFFICE.

FRITZ HOFMANN, CARL COUTELLE, KURT MEISENBURG, AND KONRAD DELBRÜCK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE.

1,074,432.  Specification of Letters Patent.  Patented Sept. 30, 1913.

No Drawing.  Application filed October 20, 1910. Serial No. 588,173.

*To all whom it may concern:*

Be it known that we, FRITZ HOFMANN, CARL COUTELLE, KURT MEISENBURG, and KONRAD DELBRÜCK, doctors of philosophy, chemists, citizens of the German Empire, residing at Elberfeld, Kingdom of Prussia, Germany, have invented new and useful Improvements in Caoutchouc Substances, of which the following is a specification.

We have found that the hydrocarbons of the series:

in which at least 2 atoms of H are substituted by methyl (the simplest alkyl group of the formula $C_nH_{2n+1}$) groups, for example:

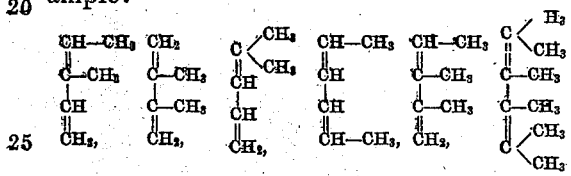

are converted by polymerization into new caoutchouc substances, which may replace natural caoutchouc in its chemical and technical applications. The process for producing the new caoutchouc substances consists in heating these hydrocarbons in an appropriate manner so that mainly the new caoutchouc substances are produced. The process may also be carried out in the presence of agents which promote polymerization, such as acetic acid, creosote, or which act as diluents, such as benzene.

In order to illustrate our invention the following examples are given, the parts being by weight:

Example 1. 500 parts of beta-gamma-dimethylbutadiene of the formula:

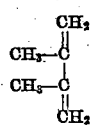

are mixed with 500 parts of benzene, the mixture is heated for 10 hours in an autoclave to 200° C. or until a test sample after distillation with steam *in vacuo* leaves a residue behind which is insoluble in alcohol, but soluble in coaltar-benzene. When this state is reached, the whole mass is distilled with steam *in vacuo* whereby by-products are removed and a residue is obtained which consists of a tough, elastic mass having properties similar to caoutchouc.

Example 2: Beta-gamma-dimethylbutadiene is boiled for 2 months with a reverse condenser on the water bath which is heated to about from 80–90° C.; the liquid becomes gradually thicker and forms finally an almost gelatinous mass. The heating is continued until a test sample after distillation, leaves a residue behind which is insoluble in alcohol but soluble in coaltar-benzene. When this stage is reached the whole mass is distilled whereupon unchanged beta-gamma-dimethylbutadiene is removed and the remaining white elastic mass is heated *in vacuo* to about 150° C. in order to remove the last remnants of the hydrocarbon, and insignificant quantities of by-products, which may have formed. The residue forms an elastic whitish mass insoluble in alcohol and soluble in benzene. It forms a nitrosite which is a yellowish powder which becomes brown and is decomposed on being heated to 155–160° C. Its brom addition product is a brownish-yellow powder which becomes black and is decomposed on being heated from 100° to 110° C. Its ozonid is a colorless oil which detonates when heated. Hydrogen peroxid and acetonyl acetone are produced on heating the ozonid with water. The formation of hydrogen peroxid can be proved by the known test with titanic acid; that of acetonyl acetone by preparing the oxime of the M. P. 134° and the known product with nitric acid $C_6H_4N_2O_3$ melting at 128° C. (see *Berichte der deutschen chemischen Gesellschaft* 24, page 1305).

Example 3: Alpha-alpha-dimethylbutadiene is heated for eight weeks to 90–100° C. or until a test sample after distillation with steam *in vacuo* leaves a residue behind which is insoluble in alcohol but soluble in coaltar-benzene and the product of the reaction is then worked up as described in Example 1.

Example 4: 1000 parts of alpha-alpha-dimethylbutadiene of the formula:

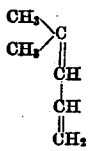

and 5 parts of acetic acid are heated for 12 hours in an autoclave to 200° C. or until a test sample after distillation with steam *in vacuo* leaves a residue behind which is insoluble in alcohol but soluble in coal tar benzene. When this stage is reached steam, finally *in vacuo* is passed through until all by-products are removed and the residue is a caoutchouc like substance.

The new caoutchouc substances are whitish substances soluble in benzene and insoluble in alcohol. They are free from protein substances which are always contained in the natural caoutchouc and play an important part in it with regard to the elasticity of the natural caoutchouc. They form ozonids, nitrosites and brom addition products.

Our method of polymerization may also be applied to mixtures of these poly-methyl-substituted erythrenes and the mixtures of these poly-methyl-substituted erythrenes with other hydrocarbons of the erythrene series and similar groups in various proportions and the thus formed mixtures of new caoutchouc substances may be employed in the arts.

Our new caoutchouc substances described herein may be vulcanized and such vulcanized caoutchouc substances may be used in the same manner as vulcanized natural caoutchouc. They are in the vulcanized form whitish to grayish products which are not adhesive. We can also use a mixture of our new caoutchouc substances described herein or a mixture of our new caoutchouc substances with any other caoutchouc substances for example with those described in our other applications Serial No. 578607 and 578608 in which we describe the polymerization of erythrene and isoprene, and subject this mixture to vulcanization, or we may mix our new caoutchouc substances with natural caoutchouc and subject this mixture to vulcanization.

We claim:—

1. As a new product a caoutchouclike substance comprising poly-methyl-substituted erythrene caoutchouc soluble in coal tar benzene and insoluble in alcohol.

2. As a new product a caoutchouclike substance comprising di-substituted erythrene caoutchouc soluble in coal tar benzene and insoluble in alcohol.

3. As a new product a caoutchouclike substance comprising beta-gamma-substituted erythrene caoutchouc soluble in coal tar benzene and insoluble in alcohol.

4. As a new product a caoutchouclike substance comprising dimethyl-substituted erythrene caoutchouc soluble in coal tar benzene and insoluble in alcohol.

5. As a new product a caoutchouclike substance comprising beta-gamma-dimethyl-butadiene caoutchouc, which is characterized by being a whitish substance soluble in coal tar benzene and insoluble in alcohol, forming a nitrosite which is a yellowish powder which becomes brown and is decomposed on being heated to 155–160° C.; forming a brom addition product which is a brownish-yellow powder which becomes black and is decomposed on being heated to 100–110° C., forming an ozonid which is a colorless oil detonating when heated, the ozonid furnishing $H_2O_2$ and acetonylacetone by treatment with boiling water; and in the vulcanized form is a whitish not adhesive powder, substantially as described.

6. The process of producing a caoutchouclike substance which comprises polymerizing a poly-methyl-substituted erythrene hydrocarbon until a product results insoluble in alcohol and separating the caoutchouclike substance from the byproducts formed during the polymerization reaction.

7. The process of producing a caoutchouclike substance which comprises heating a poly-methyl-substituted erythrene hydrocarbon until a product results insoluble in alcohol and separating the caoutchouclike substance from the byproducts formed during the polymerization reaction.

8. The process of producing a caoutchouclike substance which comprises polymerizing a poly-methyl-substituted erythrene hydrocarbon until a product results insoluble in alcohol and subjecting the resulting product to vacuum distillation.

9. The process of producing a caoutchouclike substance which comprises polymerizing a poly-methyl-substituted erythrene hydrocarbon by heating until a caoutchouc-like product results insoluble in alcohol but soluble in coal-tar benzene and subjecting the resulting product to vacuum distillation.

10. The process of producing a caoutchouclike substance which comprises polymerizing a poly-methyl-substituted erythrene hydrocarbon in the presence of an agent of acid reaction.

11. The process of producing a caoutchouclike substance which comprises polymerizing a poly-methyl-substituted erythrene hydrocarbon in the presence of an organic agent of acid reaction.

12. The process of producing a caoutchouclike substance which comprises polymerizing a poly-methyl-substituted erythrene hydrocarbon in the presence of an acid.

13. The process of producing a caoutchouc-like substance which comprises polymerizing a poly-methyl-substituted erythrene hydrocarbon in the presence of an organic acid.

14. The process of producing a caoutchouc-like substance which comprises polymerizing a poly-methyl-substituted erythrene hydrocarbon by heating in the presence of an agent of acid reaction until a caoutchouc-like product results insoluble in alcohol but soluble in coal-tar benzene.

15. The process of producing a caoutchouc-like substance which comprises polymerizing a poly-methyl-substituted erythrene hydrocarbon by heating in the presence of an organic agent of acid reaction until a caoutchouc-like product results insoluble in alcohol but soluble in coal-tar benzene.

16. The process of producing a caoutchouc-like substance which comprises polymerizing a poly-methyl-substituted erythrene hydrocarbon by heating in the presence of an acid until a caoutchouc-like product results insoluble in alcohol but soluble in coal-tar benzene.

17. The process of producing a caoutchouc-like substance which comprises polymerizing a poly-methyl-substituted erythrene hydrocarbon by heating in the presence of an organic acid until a caoutchouc-like product results insoluble in alcohol but soluble in coal-tar benzene.

18. The process of producing a caoutchouc-like substance which comprises polymerizing a beta-gamma-dimethyl erythrene hydrocarbon until a product results insoluble in alcohol and separating the caoutchouclike substance from the byproducts formed during the polymerization reaction.

19. The process of producing a caoutchouc-like substance which comprises heating a beta-gamma-dimethyl erythrene hydrocarbon until a product results insoluble in alcohol and separating the caoutchouclike substance from the byproducts formed during the polymerization reaction.

20. The process of producing a caoutchouc-like substance which comprises polymerizing a beta-gamma-dimethyl erythrene hydrocarbon until a product results insoluble in alcohol and subjecting the resulting caoutchouc product to vacuum distillation.

21. The process of producing a caoutchouc-like substance which comprises polymerizing a beta-gamma-dimethyl erythrene hydrocarbon by heating under caoutchouc-forming conditions until a caoutchouc-like substance results insoluble in alcohol but soluble in coal-tar benzene and subjecting the resulting product to vacuum distillation.

22. The process of producing a caoutchouc-like substance which comprises polymerizing a beta-gamma-dimethyl erythrene hydrocarbon in the presence of an agent of acid reaction.

23. The process of producing a caoutchouc-like substance which comprises polymerizing a beta-gamma-dimethyl erythrene hydrocarbon in the presence of an organic agent of acid reaction.

24. The process of producing a caoutchouc-like substance which comprises polymerizing a beta-gamma-dimethyl erythrene hydrocarbon in the presence of an acid.

25. The process of producing a caoutchouc-like substance which comprises polymerizing a beta-gamma-dimethyl erythrene hydrocarbon in the presence of an organic acid.

26. The process of producing a caoutchouc-like substance which comprises polymerizing a beta-gamma-dimethyl erythrene hydrocarbon by heating in the presence of an agent of acid reaction until a caoutchouc-like substance results insoluble in alcohol but soluble in coal-tar benzene.

27. The process of producing a caoutchouc-like substance which comprises polymerizing a beta-gamma-dimethyl erythrene hydrocarbon by heating in the presence of an organic agent of acid reaction until a caoutchouc-like substance results insoluble in alcohol but soluble in coal-tar benzene.

28. The process of producing a caoutchouc-like substance which comprises polymerizing a beta-gamma-dimethyl erythrene hydrocarbon by heating in the presence of an acid until a caoutchouc-like substance results insoluble in alcohol but soluble in coal-tar benzene.

29. The process of producing a caoutchouc-like substance which comprises polymerizing a beta-gamma-dimethyl erythrene hydrocarbon by heating in the presence of an organic acid until a caoutchouc-like substance results insoluble in alcohol but soluble in coal-tar benzene.

30. The process of producing a caoutchouc-like substance which comprises polymerizing beta-gamma-dimethyl-erythrene under conditions which prevent volatilization of the employed hydrocarbon by heating until a test sample after suitable distillation leaves a residue behind which is soluble in coal tar benzene and insoluble in alcohol.

In testimony whereof we have hereunto set our hands in the presence of two subscribing witnesses.

FRITZ HOFMANN. [L. S.]
CARL COUTELLE. [L. S.]
KURT MEISENBURG. [L. S.]
KONRAD DELBRÜCK. [L. S.]

Witnesses:
CHAS. J. WRIGHT,
WALTER VONNEGUT.

Correction in Letters Patent No. 1,074,432.

It is hereby certified that in Letters Patent No. 1,074,432, granted September 30, 1913, upon the application of Fritz Hofmann, Carl Coutelle, Kurt Meisenburg, and Konrad Delbrück, of Elberfeld, Germany, for an improvement in "Caoutchouc Substances," an error appears in the printed specification requiring correction as follows: Page 3, lines 51–52, for the words "caoutchouc product" read *caoutchouc-like product;* and that the said Letters Patent should be read with this correction therein that the same may conform to the record of the case in the Patent Office.

Signed and sealed this 16th day of December, A. D., 1913.

[SEAL.]

J. T. NEWTON,
*Acting Commissioner of Patents.*